United States Patent [19]

Godbersen

[11] E Patent Number: Re. 32,118

[45] Reissued Date of Patent: Apr. 22, 1986

[54] BOAT HOIST

[76] Inventor: Byron L. Godbersen, 710 Circle Dr., Ida Grove, Iowa 51445

[21] Appl. No.: 672,918

[22] Filed: Nov. 19, 1984

Related U.S. Patent Documents

Reissue of:

[64] Patent No.: 4,401,335
Issued: Aug. 30, 1983
Appl. No.: 268,359
Filed: May 29, 1981

[51] Int. Cl.[4] ..... B25J 7/00

[52] U.S. Cl. ..... 187/1 R; 187/8.59; 414/680

[58] Field of Search ..... 187/1 R, 8.59; 114/44, 114/45, 344; 414/680; 405/221, 3; 294/84, 82.1, 86.4, 67.2, 68.1, 68.3, 68.23, 69.2

[56] References Cited

U.S. PATENT DOCUMENTS

| | | | |
|---|---|---|---|
| 2,307,420 | 1/1943 | Mead | 27/32 |
| 2,529,948 | 11/1950 | Jones | 254/281 |
| 2,562,189 | 7/1957 | Harris | 414/461 |
| 2,589,882 | 3/1952 | Sinner et al. | 254/338 |
| 3,077,742 | 2/1963 | Brown | 405/3 |
| 3,139,732 | 7/1964 | Thompson | 405/3 |
| 3,169,644 | 2/1965 | Godbersen | 414/680 |
| 3,177,668 | 4/1965 | Schneider et al. | 405/3 |
| 3,265,024 | 8/1966 | Kramlich | 114/45 |
| 3,697,048 | 10/1972 | Sarno | 187/8.59 |
| 3,757,962 | 9/1973 | Chavet | 414/680 |

FOREIGN PATENT DOCUMENTS 570080 2/1933 Fed. Rep. of Germany .

*Primary Examiner*—James B. Marbert
*Attorney, Agent, or Firm*—Henderson & Sturm

[57] ABSTRACT

A boat hoist including a novel level lift suspension system which results in even application of forces to points on the moveable platform remote from the point of attachment of the lifting device, thus eliminating twisting of the loaded platform.

10 Claims, 5 Drawing Figures

BOAT HOIST

Matter enclosed in heavy brackets [ ] appears in the original patent but forms no part of this reissue specification; matter printed in italics indicates the additions made by reissue.

BACKGROUND OF THE INVENTION

The present invention relates generally to boat hoists and more particularly to a boat hoist employing a novel level lift suspension system.

Conventional boat hoists employ winches or other lifting devices wherein a lifting cable is attached to one or more points on one side of the hoist. As the lifting device is actuated to raise the movable platform on which the boat rests, the weight of the boat tends to torque or twist the platform due to lack of upwardly directed force on the side of the platform opposite the lifting device. This twisting of the platform results in a binding between the points of contact of the platform and the framework which supports the platform, resulting in turn in unsatisfactory performance and excessive wear and maintenance. Those concerned with these problems recognize the need for an improved boat hoist.

SUMMARY OF THE INVENTION

The present invention includes a light-weight aluminum boat hoist which employs a new stabilized lift suspension system which eliminates the torque or twisting of the movable platform as it is moved between its lowered position and its raised position. The upwardly directed force which is applied by a winch or similar lifting device is evenly distributed to points on the platform remote from the point or points where the lifting device is attached to the platform. The force is transmitted by a fixed length cable attached to the frame on which the platform is movably mounted. One end of the cable is attached to the frame below the point at which the upwardly directed force is applied and below the lowered position of the platform. The opposite end of the cable is attached to the frame above a point of the platform remote from the point where the force is applied and above the raised position of the platform. The cable extends vertically upward and is trained over a first pulley adjacent the point of force application, thence substantially horizontal to a second pulley located remote therefrom, thence vertically upward again to the frame. Since the sum of the lengths of the two vertical sections of cable is constant the lengthening of one section results in a corresponding shortening of the other section which in turn results in an even application of the force.

An object of the present invention is the provision of an improved boat hoist.

Another object is to provide a boat hoist having a novel level lift suspension system which eliminates the torque or twisting of the movable platform as it is moved between the lowered position and the raised position.

A further object of the invention is the provision of a boat hoist which is easy to install and maintain.

Still another object is to proivde a boat hoist designed such that it is possible to use light-weight aluminum materials of construction.

Other objects, advantages, and novel features of the present invention will become apparent from the following detailed description of the invention when considered in conjunction with the accompanying drawings.

DESCRIPTION OF THE PREFERRED EMBODIMENTS

Figures 1, 2, 3, 4, 5:
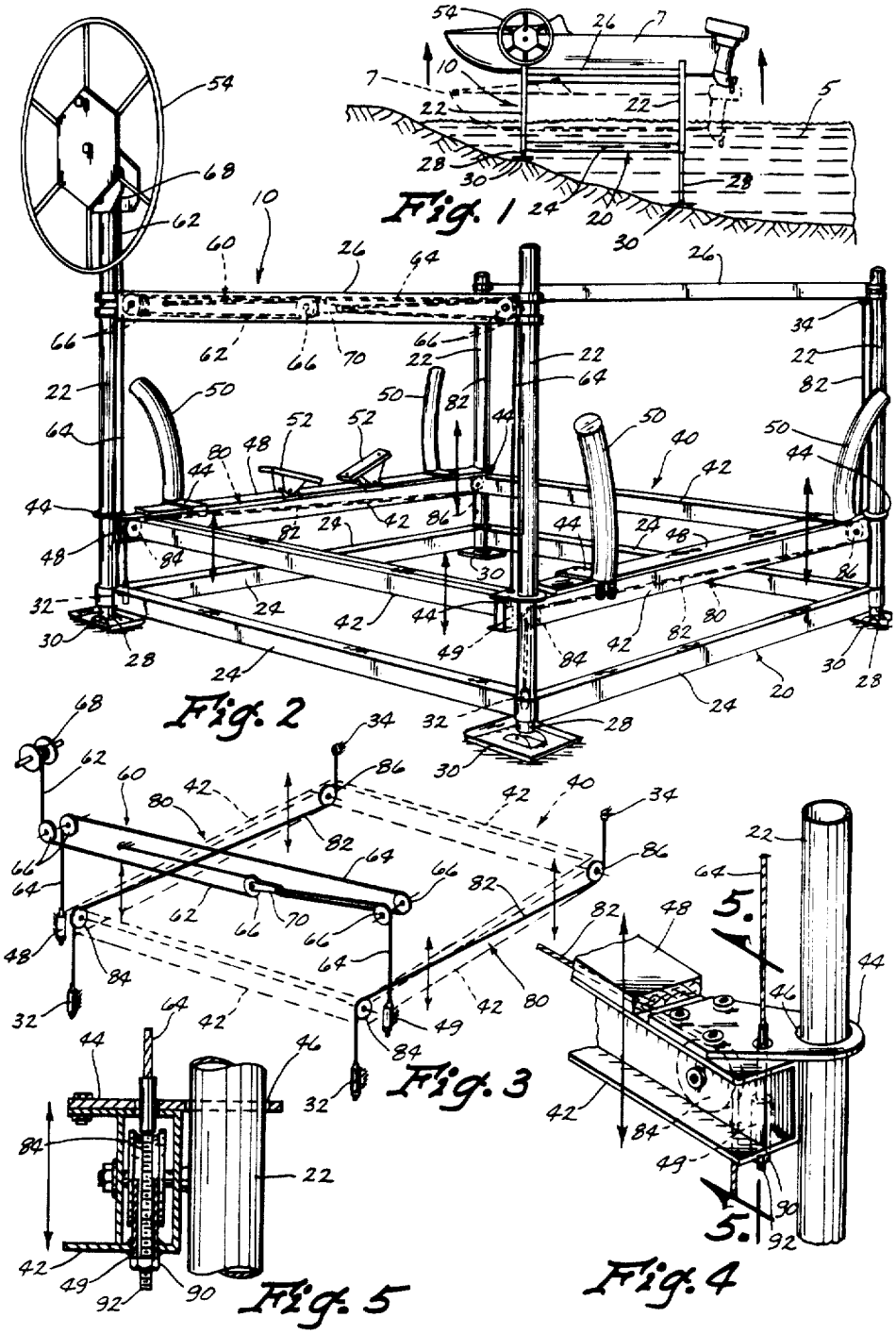
FIG. 1 is a side elevational view showing the boat hoist positioned in a body of water, with a boat supported thereon in the elevated position shown in full line, and the boat in the lowered position shown in dashed lines.
FIG. 2 is a perspective view of the boat hoist wherein portions of the lifting and stabilizing cables and pulleys are shown in dashed lines.
FIG. 3 is a schematic view showing the detail of the lifting and stabilizing cables and pulleys, wherein the movable platform is shown in dashed lines.
FIG. 4 is an enlarged cut-away perspective view illustrating the slideable attachment of the movable platform to the frame.
FIG. 5 is a sectional view taken along line 5—5 of FIG. 4.

Referring now to the drawings wherein like reference numerals designate identical or corresponding parts throughout the several views, FIG. 1 shows the boat hoist 10 positioned in a body of water 5 and supporting a boat 7 in the raised or elevated position.

FIG. 2 illustrates the structure of the boat hoist 10 which includes a frame 20 and a vertically movable platform 40 attached thereto. The frame 20 consists of a plurality of vertically disposed posts or columns 22 interconnected by bottom rails 24 thus forming a rectangular structure. Top rails 26 interconnect the upper portions of columns 22 on opposite sides of the rectangular structure leaving an unobstructed passageway for the boat 7. Telescoping adjustable legs 28 extend downwardly from each column 22 and base pad 30 is pivotally attached to the bottom portion of each leg 28.

The movable platform 40 includes a plurality of interconnected beams 42 which form a rectangular structure. Slide plates 44, attached to each corner of the structure, include an outwardly extending tab having an opening 46 which slideably engages the columns 22, thus allowing the platform 40 to move between a lowered position and a raised position. The top surface of opposing beams 42 is covered with a redwood deck piece 48 which in turn supports spring-biased cushioned guide brackets 50 and pivotal centering pads 52.

A winch having a self-energized clutch brake (not shown) is mounted on one column 22 and is operated by lift-wheel 54. As most clearly shown in FIG. 3, the lifting system 60 is composed of a series of cables 62 and 64 and pulleys 66 which exert an upwardly directed force on the movable platform 40. One end of cable 62 is attached to the winch reel 68 and the opposite end is attached to rail 26. Block 70 is attached to cable 64 intermediate its ends and the ends of cable 64 are attached to opposing beams 42 at points 48 and 49. As the lift-wheel 54 is rotated the cable 62 is wound on reel 68 and an upwardly directed force is exerted at points 48 and 49 of platform 40. Although the illustrated lifting system 60 yields a 2 to 1 lift advantage, it is to be understood that any of a number of different lifting systems could be employed that would exert an upwardly directed force on one or more points of the platform 40.

Again referring to FIG. 3, two identical stabilizing systems 80 are shown—one operating in conjunction with the force exerted at point 48, and one operating in conjunction with the force exerted at point 49. Each stabilizing system 80 acts to transmit the upwardly directed force to a point on the platform 40 remote from the points 48 and 49, such that the force is evenly distributed between all points, and the tendency of the platform to twist is minimized. The stabilizing system 80 includes a flexible cable 82 having a predetermined length and having one end attached to point 32 of the frame 20 and having the opposite end attached to point 34 of the frame 20. Point 32 is located below the lowered position of platform 40 and point 34 is located above the raised position of platform 40. Cable 82 is trained over pulley 84 located adjacent points 48 and 49 respectively, and cable 82 is trained under pulley 86 located remote from points 48 and 49.

As shown most clearly in FIGS. 3 and 5, the cables 64 and 82 are adjustable in length. The adjustment is made by tightening or loosening nut 90 on threaded stud 92.

In operation the lift-wheel 54 is rotated to lower the platform 40 into the water and the boat 7 is positioned over the platform 40. The lift-wheel 54 is then rotated in the opposite direction, thus exerting an upwardly directed force at points 48 and 49 of the platform 40. Cable 82 is of a fixed predetermined length and cable 82 is trained over pulley 84 and under pulley 86. Therefore, as the length of the portion of cable 82 between pulley 84 and the point 32 is increased, the length of the portion of cable 82 between pulley 86 and point 34 must decrease by a like amount, resulting in an even distribution of the upwardly directed force at points 48 and 49 and the corresponding remote points represented by pulleys 86. The platform 40 is thus elevated to the desired raised position in a smooth efficient manner which eliminates the torque or twisting of the platform 40 and the resulting binding of the contact points of the platform 40 and frame 20.

Obviously many modifications and variation of the present invention are possible in light of the above teachings. It is therefore to be understood that, within the scope of the appended claims, the invention may be practiced otherwise than as specifically described.

I claim:

[1. A boat hoist, comprising:

a vertical frame;

a horizontally disposed platform attached to said frame, said platform being movable in a vertical direction between a lowered position and a raised position;

means for exerting an upwardly directed force at a first point on said movable platform; and means for transmitting said upwardly directed force to a second point on said movable platform remote from said first point, wherein said upwardly directed force is evenly distributed between said first point and said second remote point, to raise the platform in a level manner.]

[2. The boat hoist of claim 1, wherein said force transmitting means includes:

a flexible cable having a predetermined length;

said flexible cable including a first end secured to said frame at a location below said first point on said movable platform and below said lowered position of said platform, and a second end secured to said frame at a location above said second remote point on said movable platform and above said raised position of said platform;

said flexible cable being disposed in slideable contacting relationship over a first member of said platform located adjacent said first point, and under a second member of said platform located adjacent said second remote point.]

3. The boat hoist of claim [1] *12*, wherein said platform is slideably attached to said frame.

4. The boat hoist of claim [1] *12*, wherein said frame includes a plurality of substantially vertical support columns extending above said moveable platform.

5. The boat hoist of claim [1] *12*, wherein said force exerting means is attached to said frame above said movable platform.

6. The boat hoist of claim [1] *12*, further including means for exerting an upwardly directed force at a plurality of points on said movable platform.

7. The boat hoist of claim [1] *12*, further including means for transmitting said upwardly directed force to a plurality of points on said movable platform remote from said first point.

8. The boat hoist of claim [2] *12*, wherein said first member and said second member of said platform are pulleys.

9. The boat hoist of claim [2] *12*, wherein said length of said flexible cable is adjustable.

10. The boat hoist of claim 4, wherein said force exerting means is attached to one of said vertical support columns above said movable platform.

11. The boat hoist of claim 10, wherein said force exerting means is a winch.

*12. A boat hoist, comprising:*

*a vertical frame;*

*a horizontally disposed platform attached to said frame, said platform being movable in a vertical direction between a lowered position and a raised position;*

*means for exerting an upwardly directed force at a first point on said movable platform; and*

*means for transmitting said upwardly directed force to a second point on said movable platform remote from said first point, wherein said upwardly directed force is evenly distributed between said first point and said second remote point, to raise the platform in a level manner;*

*wherein said force transmitting means includes:*

*a flexible cable having a predetermined length;*

*said flexible cable including a first end secured to said frame at a location below said first point on said movable platform and below said lowered position of said platform, and a second end secured to said frame at a location above said second remote point on said movable platform and above said raised position of said platform;*

*said flexible cable being disposed in slideable contacting relationship over a first member of said platform located adjacent said first point, and under a second member of said platform located adjacent said second remote point.*

* * * * *